July 13, 1948.　　　W. M. HUSTON　　　2,445,116
LOAD HANDLING EQUIPMENT

Filed Oct. 31, 1942　　　10 Sheets-Sheet 4

INVENTOR
William M. Huston
BY
ATTORNEYS

July 13, 1948. W. M. HUSTON 2,445,116
LOAD HANDLING EQUIPMENT
Filed Oct. 31, 1942 10 Sheets-Sheet 6

INVENTOR
William M. Huston
BY
ATTORNEYS

July 13, 1948. W. M. HUSTON 2,445,116
LOAD HANDLING EQUIPMENT
Filed Oct. 31, 1942 10 Sheets-Sheet 8

Fig. 11.

INVENTOR
William M. Huston
BY
ATTORNEYS

Patented July 13, 1948

2,445,116

UNITED STATES PATENT OFFICE 2,445,116

LOAD HANDLING EQUIPMENT

William M. Huston, Lima, Ohio

Application October 31, 1942, Serial No. 464,006

7 Claims. (Cl. 212—59)

Objects and advantages

This invention relates to load handling equipment, and particularly to that field of such equipment which comprises derricks, power shovels, locomotive cranes, crawler cranes, and the like; and the invention relates more specifically to the boom operating mechanism on machines of this general type, being particularly useful as applied to crawler cranes including those machines which are convertible from shovel operation to crane operation, which in service are apt to encounter a wide variety of operating conditions and requirements.

In the art, for example, it has been customary to make such machines readily convertible for various types of operation, such as shovel, dragline, clam-shell, trench hoe, and lifting crane work; such conversion being accomplished by using the same machinery base and power plant, but substituting different booms, buckets, cables, operating parts, etc.

Whether the machine was designed fundamentally for one type of work or for another, or was designed for convertibility by making certain substitutions as above mentioned, there has customarily been a serious drawback in the boom operating mechanism. For example, for certain classes of work a high-speed or "live" boom is important, and in other classes of work a slower, and more accurately controllable, boom is necessary; and while it has been feasible, by extensive alteration of the machine, to take out the high speed drive mechanism and substitute the low speed and more accurate drive mechanism, or vice versa, it has not been possible to do this in a simple way. Still less has it been possible to selectively operate the boom at will in either manner, in a single, self-contained machine. This has been a great handicap, particularly in a machine arranged for crane operation.

One example will illustrate the point. A contractor may have a crane on a job where at one time he is called upon to move sand and gravel with a clam-shell bucket, and thereafter called upon to use the crane to set steel or place masonry. For the first purpose, a fast live boom is highly advantageous; whereas the second purpose requires lower boom operating speeds and extreme accuracy in spotting the load. For the first of these operations, a high speed drive from the Diesel engine (or equivalent power plant) is needed for raising the boom, which conveniently can be lowered by gravity, under the control of a band brake or the like. For the second purpose, it is practically essential that the boom be raised and lowered by a low speed drive, preferably one which is self-locking at any point where it is stopped. In practice, the contractor would either have to have both types of machines on the job, which in many cases would be prohibitive, or he would have to utilize a slow boom machine for both phases of the work, to the delay and possible detriment of the job, or he would have to effect a conversion of the boom hoist mechanism in the field, which would be almost out of the question.

It is the primary purpose of the present invention to overcome the above-mentioned, and allied, difficulties and disadvantages of the prior art, and in general to provide in a load handling machine a boom hoist system comprising selectively operable low speed and high speed drives between the power plant and the boom, with at least the low speed drive preferably reversible and/or preferably self-locking.

Another object of the invention is the provision, in such a machine, of low speed and high speed drive mechanisms, at least certain portions of which can be interchangeably located in a plurality of different positions in the general assembly of the machine, so that their arrangement is flexible in order to accommodate the requirements of other parts of the machinery.

Still another object of the invention is the provision, in such a machine, of a boom drive mechanism, and preferably such mechanism of the selectively low speed and high speed type, so constructed and arranged that at least a part of such mechanism may be substituted for, and/or occupy the space normally occupied by, a part of the dipper crowding mechanism usually employed when the machine is designed or is convertible for use as a shovel.

More specifically, the invention contemplates the operation of a multi-part boom hoist line, and the operation of such a line through a plurality of drums, by differing, selectively engageable, drives; and further the operation of both drums together through one of said drives, or together through the other of said drives.

Still more specifically, the invention contemplates the interposition between the boom hoist shaft and a jack shaft, or equivalent, of a self-locking low speed drive, desirably of the worm type, and a non-locking high speed drive, desirably of the spur gear type, preferably with all gears of both drives in constant mesh, and with means for selectively engaging and disengaging said drives with respect to one or the other of said shafts; and further the incorporation of drive reversing means in association with the worm drive, and braking means (and a safety latch) in association with the spur gear drive.

According to a further feature of the invention, the operations of the two selectively operatable drives are positively interrelated or interlocked.

Still further, the invention contemplates the utilization of a fluid pressure system, and specifically a pneumatic system, for operating or controlling one or both of the boom hoist drives.

Furthermore, according to the preferred embodiment of the invention, the fluid pressure control system is utilized to effect the interrelation or interlocking operations of the two drives; and it is further contemplated that this system shall so operate as to prevent conjoint engagement of both the raising and lowering clutches of the worm gear drive; also to prevent conjoint operation of the worm gear drive and spur gear drive; and finally to avoid conjoint engagement of the spur gear drive clutch and brake.

According to a further feature of the invention, the interchangeability of portions of the mechanism (already referred to) is worked out in such a way that either the high-speed drive or the low-speed drive, alternatively, may be omitted entirely when the machine is originally assembled, but installed afterwards, if and when desired. Likewise, when only one drive is installed it may be located at different points (along the boom hoist shaft) and may be adapted for crane, shovel, or other work; and when used for shovel work it may cooperate with either the chain or cable crowd types. Further, whether the machine is assembled with both drives or with only one of them, there may be employed therewith (on the boom hoist shaft) either a right-hand drum, or a left-hand drum, or both. According to the preferred embodiment of the invention, all of this is accomplished by the employment of cooperating, removable and interchangeable units; and therefore such units per se are also features of the invention. Typical novel units are claimed in my divisional application, Serial No. 791,892 filed December 15, 1947.

How the foregoing objects and advantages are obtained, together with others which are incident to the invention or which will occur to those skilled in the art, will be apparent from the following description, taken in conjunction with the accompanying drawings.

Figure 1:
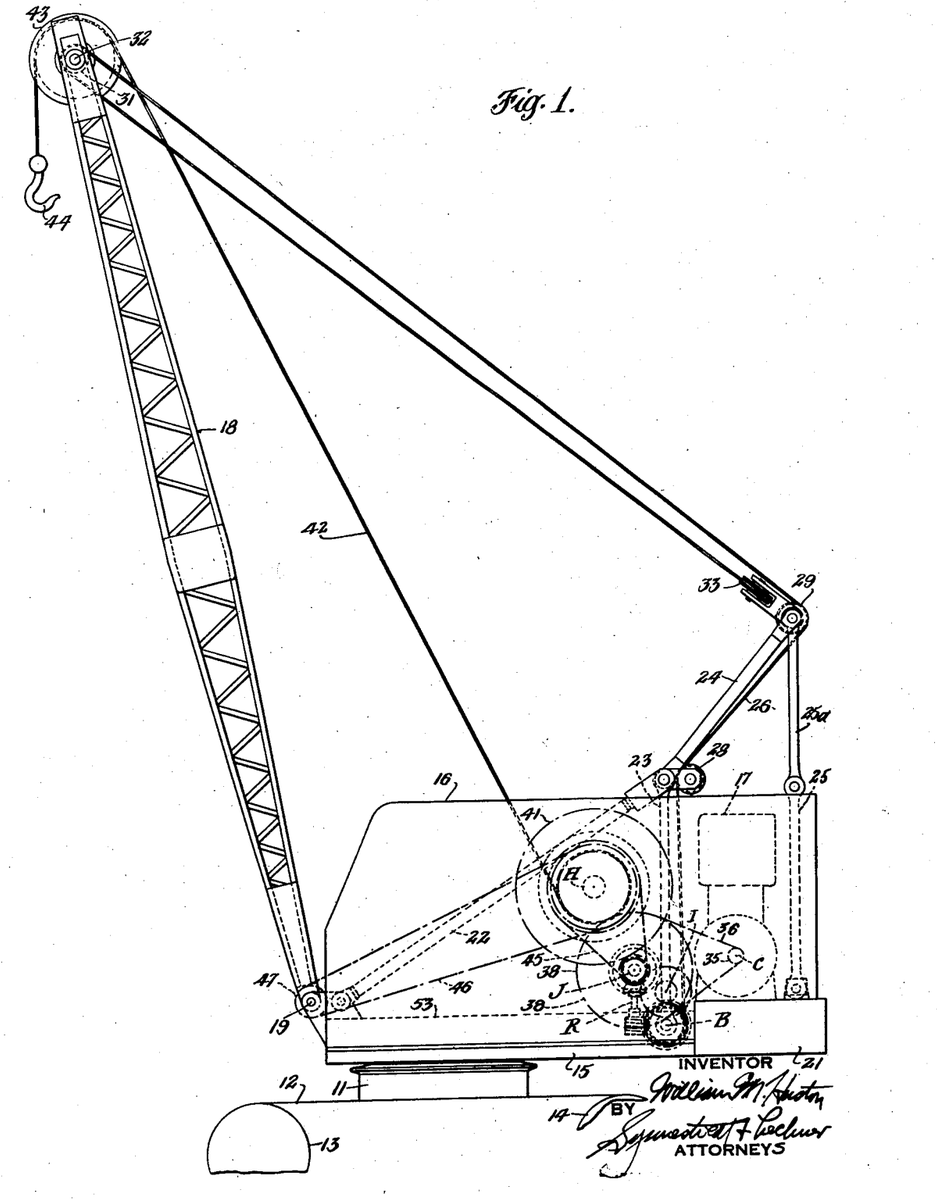
Figure 1 is a fragmentary side elevational view of a load-handling machine rigged as a crane, the figure illustrating in dotted outline certain of the essential shafts, gears and other elements of the machinery.

General description of machine (Fig. 1)

Certain of the major parts of a typical machine to which my invention is applicable are illustrated in Figure 1. In fragmentary outline there is seen a crawler tractor or base 11 having the usual endless tracks or crawler treads 12 which pass around positioning and driving tumblers 13 and 14. Upon the crawler truck is mounted a rotating base or turntable 15 which, within the cab or housing 16, carries a power plant such as a Diesel engine indicated in outline at 17, and an assembly of shafts, drums, clutches and the like (only certain ones of which are illustrated) which are employed for controlling and distributing the power from the engine to the ultimate operating parts of the machine. The centers of the shafts illustrated are identified as follows: crankshaft C, jack shaft J, idler shaft I, boom hoist shaft B and hoist drum shaft H. The upright reversible shaft R is also shown.

The machine illustrated is equipped with a crane boom 18, pivoted at its base by suitable pins 19 upon the turntable 15. The boom (which is often much longer than the somewhat diagrammatic showing thereof in Figure 1) and the loads it may carry are counterbalanced by the machinery and the counterweight 21. For supporting and operating the boom, I have illustrated a high gantry comprising the compression members 22, 23 and 24 and tension members 25 and 25a;

these parts being duplicated at the two sides of the machine. Such gantry structure is more fully described, and is claimed, in my copending application, Serial No. 421,899, filed December 6, 1941, now Patent No. 2,335,858 granted December 7, 1943.

Figure 2:
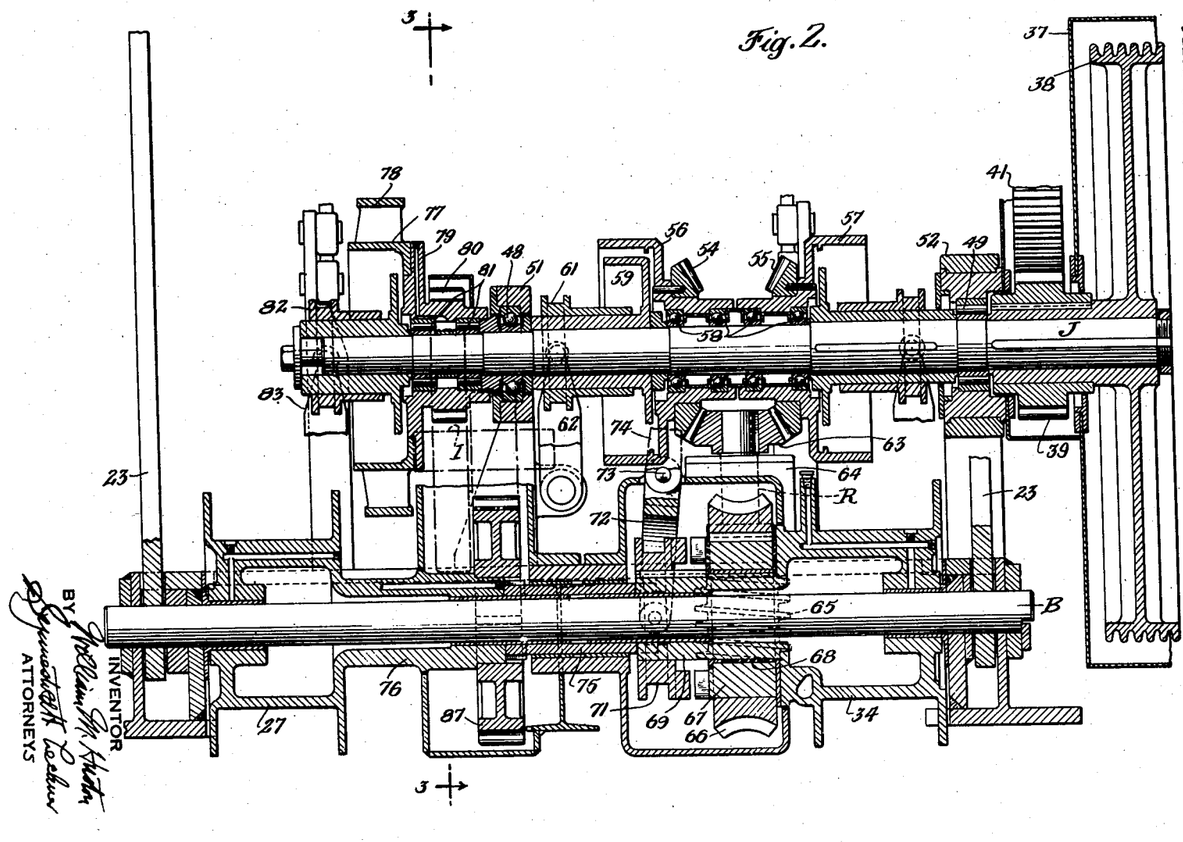
Figure 2 is a fragmentary irregular vertical section, to a larger scale than Figure 1, taken transversely of the machine, in the region of the jack shaft and boom hoist shaft, and showing the intermediate or idler shaft in chain dotted lines, this view being taken approximately on the line 2—2 of Figure 3.
Figure 4:
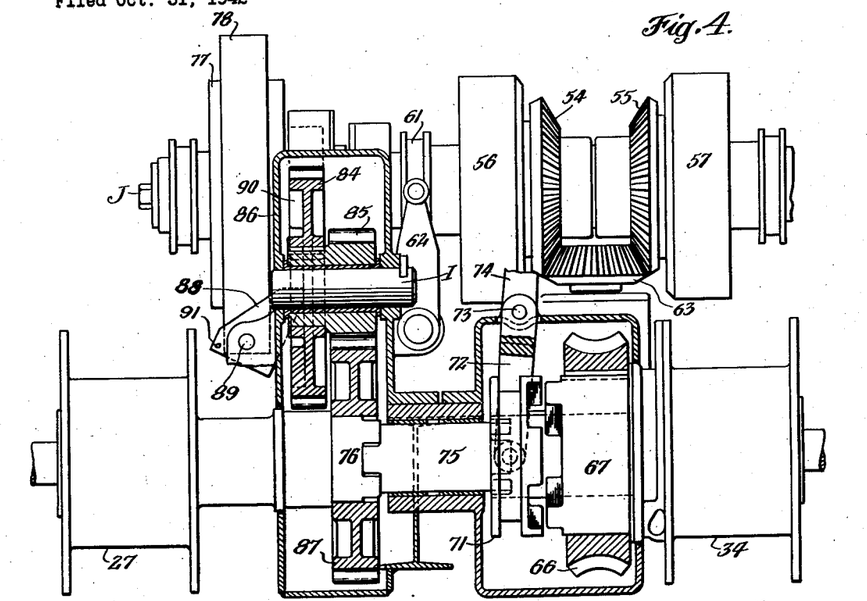
Figure 4 is a transverse section taken approximately on the line 4—4 of Figure 3, illustrating in elevation the boom hoist drums and the clutches associated with the jack shaft and boom hoist shaft.
Figure 5:
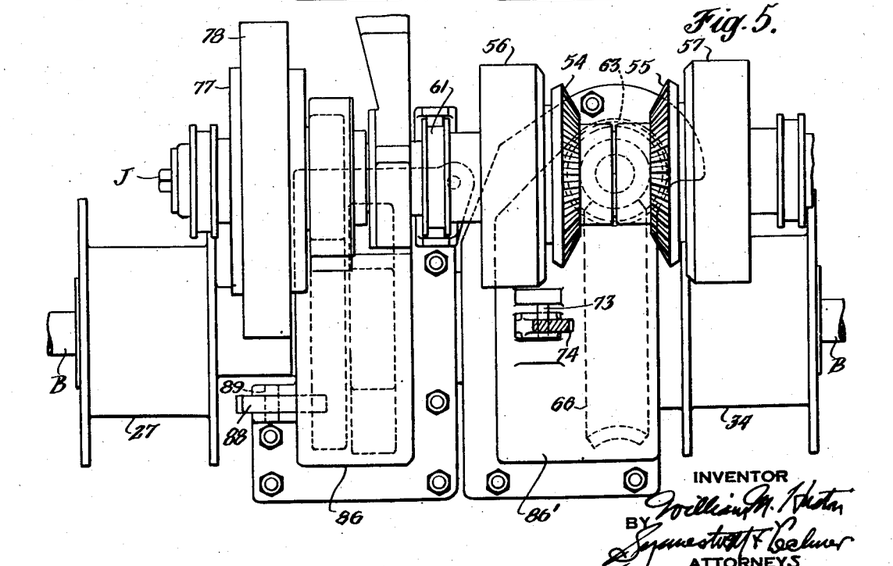
Figure 5 is a plan view of the mechanism shown in Figure 4.

Although other arrangements of boom hoist line may be used, the cable 26 shown in this instance is reeved as a four-part line (two runs of the line being illustrated in the drawing, and the other two being located behind them). The reeving of the cable 26 is as follows:

One end of the cable is secured to and adapted to be wound on the left-hand boom hoist drum 27 (see Figures 2, 4 and 5). The cable thence runs upwardly over guide sheave 28, then upwardly and rearwardly to a second guide sheave 29, then upwardly and forwardly to a small sheave 31 on the boom point shaft 32, thence downwardly and rearwardly to one of the transverse sheaves 33 of the cross-over assembly. From here, the cable crosses over to the right-hand side of the machine, thence around a similar cross-over sheave 33, boom point sheave 31, upper guide sheave 29 and lower guide sheave 28, and finally down to the right-hand boom hoist drum 34, to which the end of the cable at that side is secured, and on which it may be wound. It will now be clear that by simultaneous rotation of the boom hoist drums 27 and 34 (in the clockwise direction as seen in Figure 1) the boom will be raised, and that a rotation of said drums in the other direction is associated with a lowering of the boom.

The power from the crankshaft C is taken by pinion 35, multiple roller chain 36 (which is within housing or shield 37) and driven sprocket 38 to the jack shaft J. From thence it may be delivered to various points of use. For example (as seen in Figure 2) power may be taken from the jack shaft by way of pinion 39 and gear 41 to the main hoist drum shaft H. From a drum on said shaft (as seen in Figure 1) a hoist cable 42 may run upwardly and pass over the large boom point sheave 43 and thence downwardly to a clamshell bucket, or to a crane hook, diagrammatically illustrated at 44. When using a shovel boom, this main hoist cable 42 would be coupled to the dipper, and in that event would ordinarily be reeved over a padlock sheave at the dipper and thence back over a second boom point sheave to another drum, or to a dead end point. (Said cable can also be used in a crowd booster arrangement, as disclosed and claimed in my copending application Serial No. 383,485, filed March 15, 1941, now Patent No. 2,339,700 granted January 18, 1944.)

Another take-off of power from the jack shaft is diagrammatically indicated in Figure 1 by the chain 45 which is adapted to cooperate with a sprocket 146 on the jack shaft (see Fig. 14), and by means of a clutch is adapted to actuate at will a crowd drum mounted concentric with hoist shaft H. From this drum, or from a sprocket associated with it, a cable or chain (as the case may be) passes forwardly as indicated at 46 to a suitable sprocket or the equivalent 47 normally located concentric with the boom pivot axis 19. This is not used when the crane boom 18 is employed, but would be used when a shovel boom is substituted, in which event suitable connections from the sprocket 47 are carried out along the boom to the dipper handle, for crowding the handle in and out. It may here be pointed out that the crowd chain 45 and its actuating sprocket on the jack shaft would normally be removed, when applying the boom hoist drive mechanism of the present invention for crane operation only, and a portion of said drive mechanism may occupy the space on the jack shaft which would normally be taken by the crowd sprocket 146 for shovel operation. This will appear more clearly hereinafter.

*Low- and high-speed boom hoist drives (Figs. 2 to 5)*

Turning now to Figures 2 to 5, it will be seen that these illustrate the two drives for the boom hoist drums, or more properly (since there is a single drive from the power plant to the jack shaft) the driving mechanism between the jack shaft and the boom hoist drums through which the two types and rates of drive are selectively available. The low speed self-locking drive will first be described.

On the jack shaft J (which is journalled in ball and roller bearings 48, 49 carried by substantial brackets 51 and 52 which are rigidly mounted on the turntable deck 53) is a pair of bevel gears 54, 55, which are respectively secured to the clutch drums 56, 57, the latter being freely journalled by ball bearings 58 upon the shaft J. The clutch drums 56 and 57 can be selectively engaged with the shaft J by means of any suitable clutch devices housed therein. One element of the clutch within the drum 56 is fragmentarily shown at 59 and an operating ring therefor is shown at 61, the latter being moved axially to actuate the clutch by means of a fork 62 controllable by the operater of the machine. The details of the clutches for thus selectively connecting the bevel gears 54, 55 to the shaft J need not be shown herein as they can be of known construction, for example of the type wherein the internal expanding clutch parts are mounted on the part 59 and are operated by toggle mechanism actuated by the axial movement of the collar formed with the ring 61.

Reversing shaft R has a bevel gear 63 which is in engagement with both of the gears 54 and 55, and said shaft is thereby alternatively rotated in one direction or the other. This shaft is journalled in a housing 64, and carries a worm 65 which meshes with a worm wheel 66 which is keyed to a jaw clutch ring 67 journalled, in turn, by an anti-friction bushing 68 on a bearing sleeve 69 formed integrally with the boom hoist drum 34. Keyed on the sleeve 69 is a jaw clutch ring 71 which can be slid into and out of engagement with the jaw clutch member 67, by means of the operating fork 72 which is pivoted at 73 and actuable by lever 74. With the jaw clutch disconnected, as shown in Figures 2 and 4, the worm drive is ineffective, and should either of the gears 54, 55 be engaged with the shaft J the only result would be an idle rotation of the worm wheel 66. There is thus a double safeguard against accidental operation of the worm drive when the spur gear drive (hereinafter to be described) is being employed.

When the jaw clutch 67, 71, is engaged, the drum 34 can be rotated in either direction, depending upon which of the gears 54, 55, is clutched to the shaft J. Since the worm and worm wheel are preferably made of such a small gashing angle that they are self-locking, i. e., that no torque applied at the drum will be able to transmit any rotary motion back through the worm wheel and worm, it is obvious that the boom hoist will lock automatically at any point to which it has been moved, so long as the jaw clutch 67, 71, remains engaged. Drum 27 will be operated in unison with drum 34, by means of the quill 75 which is in engagement with the teeth shown on the end of sleeve 69 of drum 34 and with similar teeth on the end of sleeve 76 of drum 27.

Figure 3:
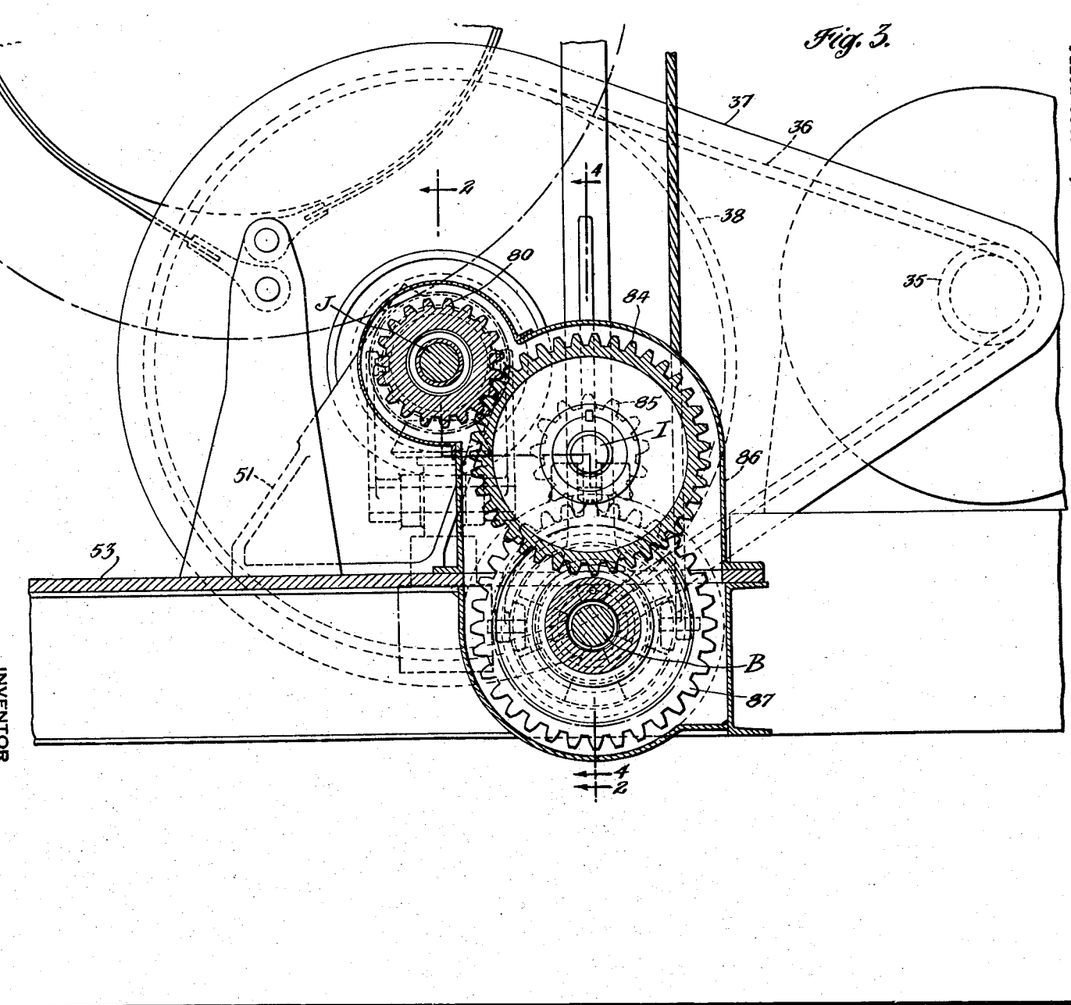
Figure 3 is a fragmentary sectional view, taken longitudinally of the machine on a vertical plane, approximately as indicated by the line 3—3 of Figure 2.

Turning now to the high speed drive, this is carried from the jack shaft J to the boom hoist shaft B in the following manner. As seen in Figures 2 and 3, a clutch and brake unit, comprising clutch drum 77 and brake drum 78, is fixed to the flange 79 of a pinion 80 which is journalled on jack shaft J by roller bearings 81. This pinion may be driven from the jack shaft by engaging the clutch against the inner surface of drum 77, by means of the clutch shifter 82 which is movable by the shifter fork 83.

Pinion 80 is in mesh with gear 84 which is keyed to form a unit with pinion 85 journalled on the idler shaft I within the housing 86. Pinion 85 is in turn in mesh with gear 87 which is keyed on sleeve 76 of drum 27 (Figures 2 and 4).

When the worm gear drive is disconnected by disengagement of jaw clutch 67, 71, the spur gear drive just described may be operated at will. Normally, when the spur gear drive clutch 77 is disengaged, the holding and lowering of the boom is controlled by the brake member 78, but a precautionary safety latch is provided, in the form of a latch member or finger 88 which is pivoted at 89 in such a position that it normally falls by gravity into engagement with ratchet teeth or stops 90 formed on the web of gear 84 (see Figure 4). This safety lock may also be used to hold the boom raised, in case it is desired to do so while releasing or adjusting the brake 78. The latch or pawl 88 may be released or disengaged by any suitable chain or cable connected thereto at 91 and extending to a position adjacent to the operator.

Figure 6:
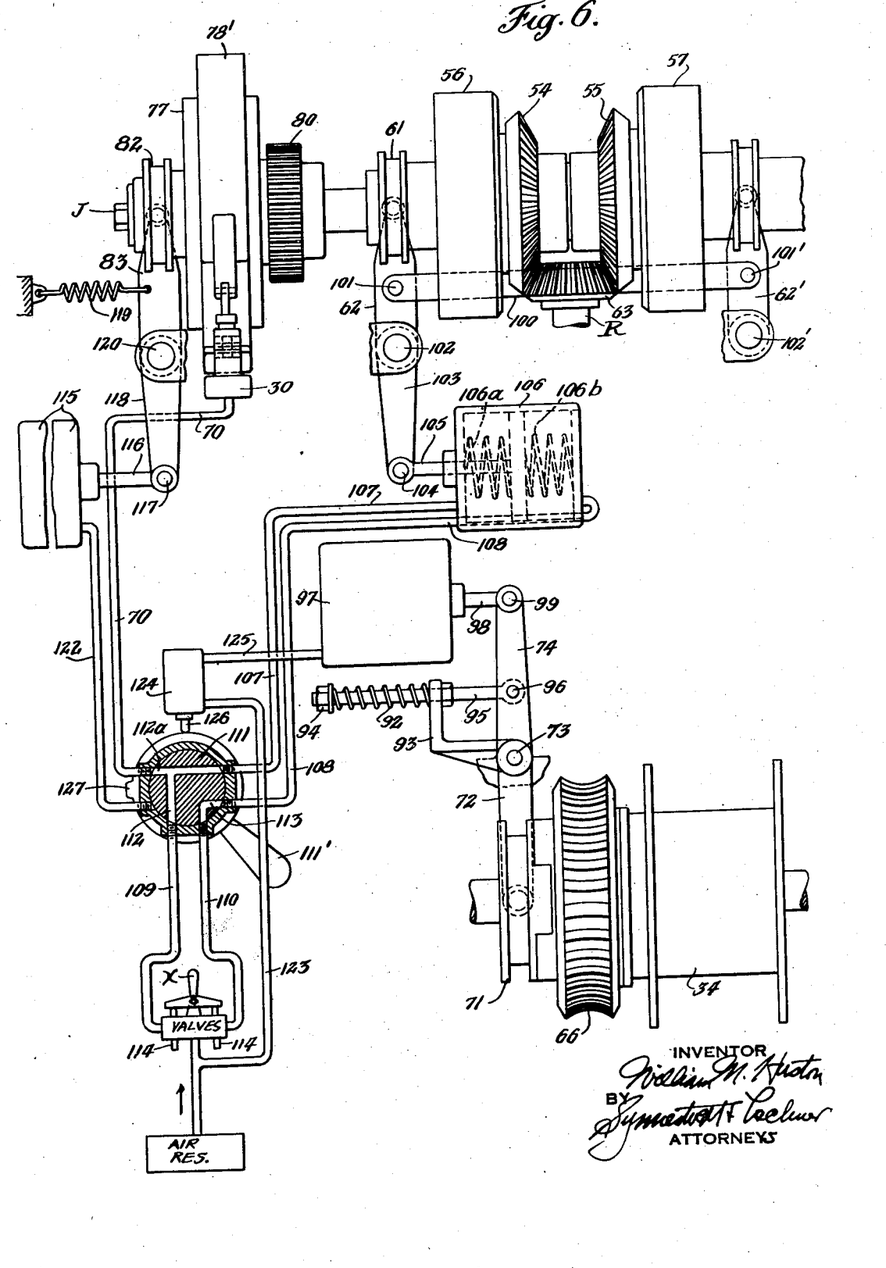
Figure 6 is a schematic diagram showing portions of the controlling and interlocking mechanism associated with the operating clutches and brake and related parts; and illustrating the distributing valve in the position for making the worm gear drive effective.
Figure 7:
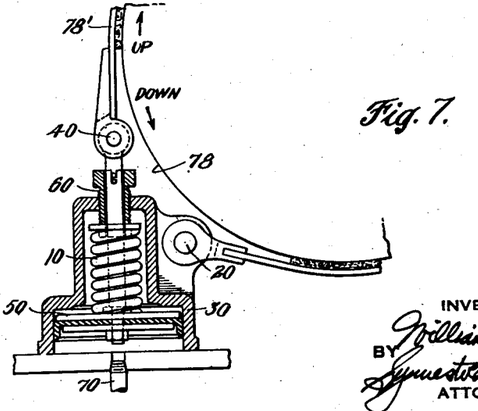
Figure 7 is an enlarged, fragmentary, sectional view of the brake operating mechanism immediately associated with the band brake on the spur gear drive—which appears in exterior outline in Figure 6 but is omitted from Figure 4 to avoid confusion with the safety latch.

The spur drive brake band is shown at 78' in Figures 6 and 7. This is normally held in gripping relation with the brake drum 78 by means of spring 10 (Figure 7) as will now be described. The band is fixed at one end by a pin 20 to a bracket formed on cylinder 30. The other end is pinned at 40 to the rod of piston 50. Spring 10 is in compression between a screw-threaded adjustable backing 60 and the piston 50, and thus puts a tension on the brake band to a degree determined by the adjustment.

When the boom is being raised, the drum 78 is turning in the direction of the arrow marked "Up" in Figure 7. This partially releases the snubbing action of the band 78', and when the spring is correctly adjusted this band will not prevent the normal power raising of the boom. However, when the boom drive is idle, and the boom load acts to turn the drum in the direction marked "Down," it acts merely to further tighten the grip of the band. When the spring adjustment is correct the boom will not descend unless the tension on the band is relieved. This may be done mechanically, but according to the present invention it is accomplished by admitting fluid under pressure (for example compressed air) into cylinder 30 through pipe 70.

Ordinary manual controls, such as hand levers and/or foot pedals, may be used to operate the various clutches 56, 57, 71, 77, as well as the brake (which might be of a positive manually-applied type); and they may be coupled together or interlocked for one or more of the following purposes: first, to prevent conjoint engagement of the clutches 56 and 57 (since one of these is for raising of the boom and the other for lowering it, through the worm gear drive); second, to prevent conjoint operation of the worm gear drive through jaw clutch 71 and one or the other of clutches 56 and 57, along with the spur gear drive through clutch 77; third, to avoid brake engagement acting against the worm drive, and fourth, to avoid conjoint engagement of the spur gear drive clutch 77 and brake (in case a manually-applied brake is used). Preferably, however, the manual controls are coupled to the clutches and brake through power means, for instance of the fluid pressure type; and in the preferred embodiment of the invention a pneumatic system is utilized for controlling these elements, and the interrelation or interlocking of the operations of said elements is wholly or largely effected through said pneumatic system.

*Powered operation and coordinated control (Figs. 6 and 7)*

Figure 6 illustrates this control hookup. In this arrangement, the jaw clutch 71 for the worm gear drive is normally held in engagement by a compression spring 92 reacting between a fixed bracket 93 and a nut 94 which is on the end of a rod 95 pivotally connected at 96 to the operating arm 74 of the shifter fork 72 which is fulcrumed at 73. An air cylinder 97 contains a piston (not shown) the piston rod 98 of which is pivotally coupled at 99 to one end of the control arm 74, for effecting disengagement of the jaw clutch, which will be described later on.

The bevel gear clutches 56 and 57 have their shifter forks 62 and 62' coupled together by a link 100 which is pivoted at 101 and 101' to said forks. The forks in turn are fulcrumed at 102, 102' respectively. It will be evident that this arrangement assures disengagement of one of these clutches when the other one is engaged. The joint operation of these two clutches is effected by means of an operating arm 103 rigid with the fork 62, the free end of lever arm 103 being pivotally coupled at 104 to the rod 105 of the piston working in the double acting cylinder 106. The right and left-hand shifting of the piston in said cylinder is effected by the delivery of air alternatively through pipe 107 and pipe 108.

From the air reservoir shown, compressed air goes to the control valves at the operator's station. These valves are controlled by handle X. By swinging this handle (left or right in Fig. 6), air may be delivered through either of the pipes 109, 110 to a distributing valve 111 having a handle 111'. In the position of the distributing valve shown in Figure 6, air may be delivered from pipe 109, through right-angle valve passage 112 and pipe 107 into the left-hand end of the cylinder 106, which will disconnect clutch 56 and connect clutch 57. To effect the opposite actuation of these clutches, air may be delivered through pipe 110, right-angle valve passage 113 and pipe 108 to the right-hand end of the cylinder 105, moving the piston therein to the left.

By this means the raising and lowering of the boom through the worm gear drive is readily effected. During such operation, the spur gear drive clutch 77 is positively maintained in its disengaged position by the pull of tension spring 119. As to the action of the spur gear drive brake, during this worm gear operation, it may be noted that the brake band 78' will merely drag on the drum while the boom is being raised (as before described). In other words, when the control handle X is tilted to the right, and air passes through the connections 110, 113 and 108, to move piston rod 105 to the left, thus engaging boom-raising clutch 56, the direction of rotation of the parts on shaft J is as indicated by the arrow marked "Up" in Figure 7, which tends to release the tension on the brake band 78', so that the latter is not a serious hindrance.

However, when the worm gear drive is operating to the lower boom, i. e. when valve handle X has been tilted to the left, to admit air through connections 109, 112 and 107, to engage the clutch 57, air will also flow through the branch connections 112a and pipe 70 into the brake releasing cylinder 30, so that the spur drive brake is positively released when the worm gear is operating to lower the boom.

Figures 8, 9:
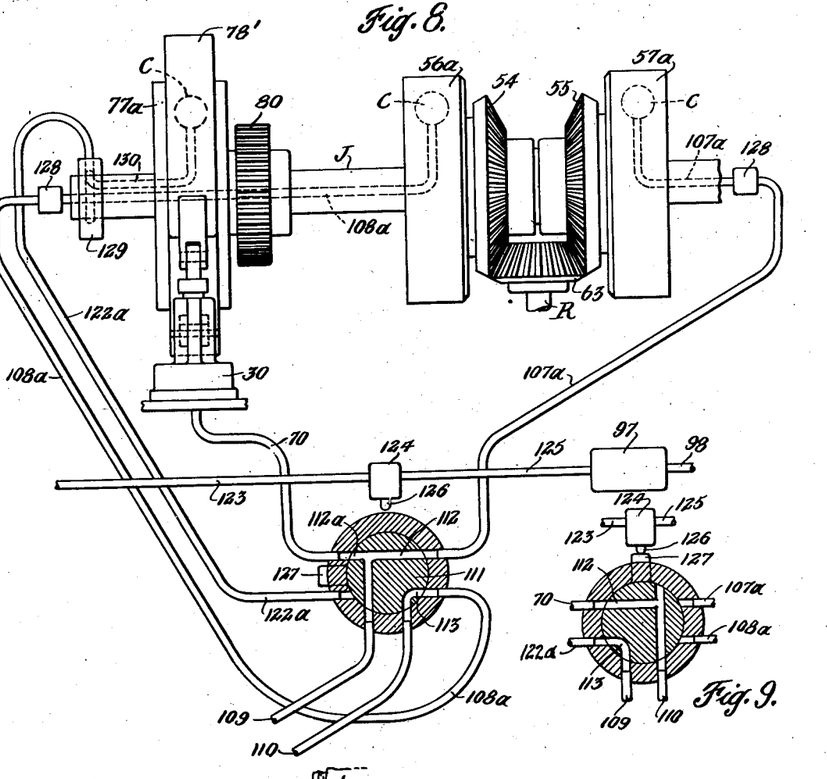
Figure 8 is a fragmentary schematic diagram of a modified embodiment of the invention wherein the clutches have power cylinders directly associated with them, and the fluid control lines are connected thereto instead of acting through levers and mechanical interlocks; the distributing valve being illustrated in the same position as in Figure 6, i. e. the position which conditions the worm drive for operation.
Figure 9 is a detail of the distributing valve in the position which conditions the spur gear drive for operation.

When the spur gear drive is to be employed, the distributing valve 111, by means of its handle 111', is turned through 90°, clockwise as viewed in Figure 6 to a position similar to that shown in Figure 9. Passage 112 then connects pipes 110 and 70; and passage 113 then connects pipe 109 and pipe 122. When control handle X is moved to admit air through connections 109, 113 and 122, the piston within cylinder 115 pulls the piston stem 116 inwardly (to the left in Figure 6), and through connections 117, 118, 83 and 82, engages the spur gear drive clutch 77 for raising the boom. The brake band 78' merely drags, as before.

On the other hand, when lever X is swung to the right, and air passes through connections 110, 112 and 70, the brake can thereby be controllably released, to allow the boom to go down by gravity (the clutch 77 being then disengaged by its spring 119).

During operation of the spur gear drive the disconnection of the worm gear drive is assured, by means of the admission of air pressure from the supply line 123 through poppet valve 124 and pipe 125 into the left-hand end of the cylinder 97. The poppet valve stem is shown at 126, and this is raised by the cam 127, when the distributing valve 111 (which carries said cam) is turned through 90°, as above described, from the position shown in Figure 6 to the position for actuating the spur gear drive. Pressure in the cylinder 97 disconnects the worm drive master clutch 71, through the connections 98, 99, 74, 72.

It might be noted that in addition to the raising operation and the lowering operation, the boom must of course be capable of being held at a given point, even with a heavy load thereon.

When the system is operating on worm drive, and neither of the clutches 56 and 57 is engaged, the boom is held stationary by virtue of the self-locking nature of the worm and worm wheel (65, 66). Springs 106a and 106b may be housed in cylinder 106 to hold the operating piston for said clutches in its mid position.

When the system is operating on spur gear drive, and the control handle X is in the mid position (shown in Figure 6) the brake band 78' will hold the boom fixed, by virtue of the snubbing action imposed by means of the spring 10 (Figure 7).

The valves under the control of lever X are preferably of the well known type which, when no operating pressure is put on their protruding stems, permit the exhaust of air from the lines 109, 110 through the exhaust outlets 114.

*Fluid pressure clutch arrangement (Figs. 8 and 9)*

Turning now to the modification shown in Figures 8 and 9, it will be noted that instead of having mechanical connections to the clutches, each clutch 56a, 57a and 77a has a self-contained air actuated cylinder and piston device C. These clutches may be of any well known fluid pressure type, but one especially well adapted for the purpose is the Parsons clutch, which is fully disclosed in copending application Serial No. 413,402 filed Oct. 3, 1941, now Patent No. 2,352,969 granted July 4, 1944.

In this arrangement (i. e. Figs. 8 and 9), the distributing valve 111 receives air alternatively from pipe 109 or pipe 110 (just as in the arrangement of Figure 6). In the position of Figure 8, if air be admitted through pipe 109, it will go through passages 112 and 107a, and cause engagement of clutch 57a for lowering the boom; and air will also go through branch 112a and pipe 70 to release the brake band 78'. On the other hand, if air is delivered through pipe 110, it will go through passage 113 and 108a to engage clutch 56a so as to raise the boom. No air is going to the spur gear drive clutch 77a, and as these fluid pressure clutches have self-contained release springs, this clutch remains disconnected.

When the distributing valve is turned through 90°, to the position of Figure 9, the cam 127 operates stem 126 of valve 124, thereby admitting air from pipe 123 to pipe 125 and thus to cylinder 97, for operating the piston stem 98 to disengage the worm gear drive. The spur gear drive may then be operated, by delivering air through pipe 109 and passages 113 and 122a to operate clutch 77a for raising the boom, and by delivering air through pipe 110 and passages 112 and 70, to admit air to brake release cylinder 30, for lowering the boom.

It will be noted that the fluid connections to clutches 56a and 57a are passed through the hollow center of shaft J, there being a fluid-tight connection accommodating relative rotation, indicated diagrammatically at 128. The fluid connection from pipe 122a to clutch 77a is by means of annular fluid-tight ring 129 having a rotational mounting on the shaft, and having an internal peripheral groove communicating with the passage 130 in said shaft.

*Interchangeable drive units (Figs. 10 to 14)*

The flexibility of adaptation of the invention is most fully illustrated by the mechanism shown in Figures 10 to 14 inclusive. In these views, the reference characters are the same as those used in Figures 1 to 7, for similar or identical parts; and in the case of modified parts the reference characters have suffixes "A," "B," etc.; while new reference characters are applied to added or substituted parts. These views show parts associated with the boom hoist drum shaft B and the jack shaft J, just as in the case of Figure 2, but most of these parts are here shown in elevation, instead of in section as in Figure 2. (For simplicity of illustration, certain parts are omitted from these views, for example: clutch details, band brake, controls, etc.)

Figure 10:
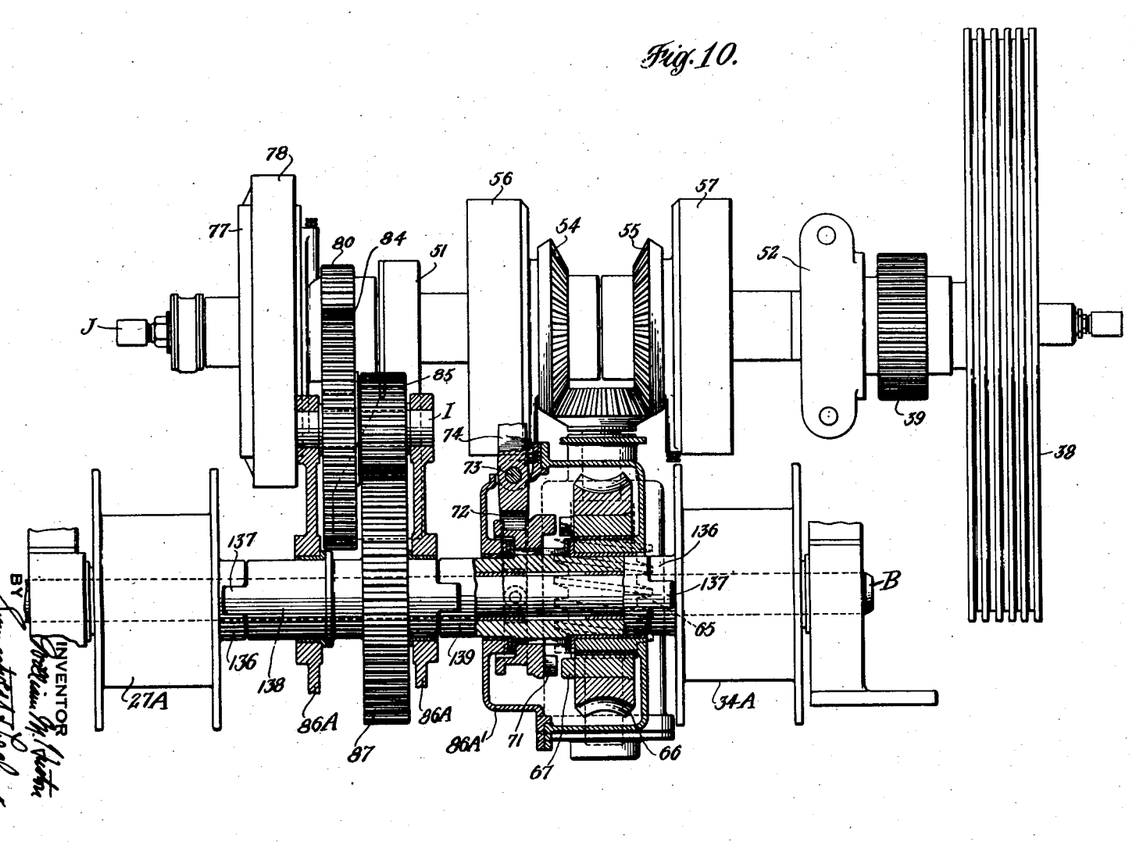
Figures 10 to 14 are views taken similarly to Figure 2 (but chiefly in elevation), illustrating the transposition and substitution of various units, in the interchangeable unit system contemplated by this invention and the invention of my said divisional application.

In Figure 10, the drive from the jack shaft to the boom hoist drum shaft may be either through the worm gear assembly or the spur gear assembly. In this form (as in the case of Fig. 2) left and right boom hoist drums 27A and 34A are employed, but instead of having elongated sleeves (such as 76 and 69, joined by the quill 75, as in Fig. 2) these drums are provided with lugs 136 interfitting with similar lugs 137 on torque tubes 138 and 139, which are themselves similarly interengaged—the torque tube 138 mounting the spur gear 87, and the torque tube 139 mounting the worm gear 66.

The various units just described are mounted on the shaft B by anti-friction bearing bushings (as fragmentarily shown where the view is in section). The relative positions of the several units can be changed, and various of these units can be eliminated and/or other parts substituted, as will later appear more fully.

Referring still to Figure 10, it will be seen that the parts on the jack shaft, in this assembly, are essentially similar to those already described with reference to Figure 2. As to the parts on the boom hoist shaft B, in order to provide the fullest interchangeability, with the least modification, the casing or framing 86A for the spur drive, and the parts of the casing or frame 86A' for the worm gear drive, are formed to fit the outside of the torque tubes (with bushings interposed, as shown), and the external securing studs or other holding means for these frames may be so located as to cooperate with either gear frame, alternatively, when they are shifted to different positions on the shaft B. (The means for securing these gear frames to a fixed part of the machine, such as base 53 of Fig. 3, may comprise studs or bolts such as shown in Fig. 5.)

Figure 11:
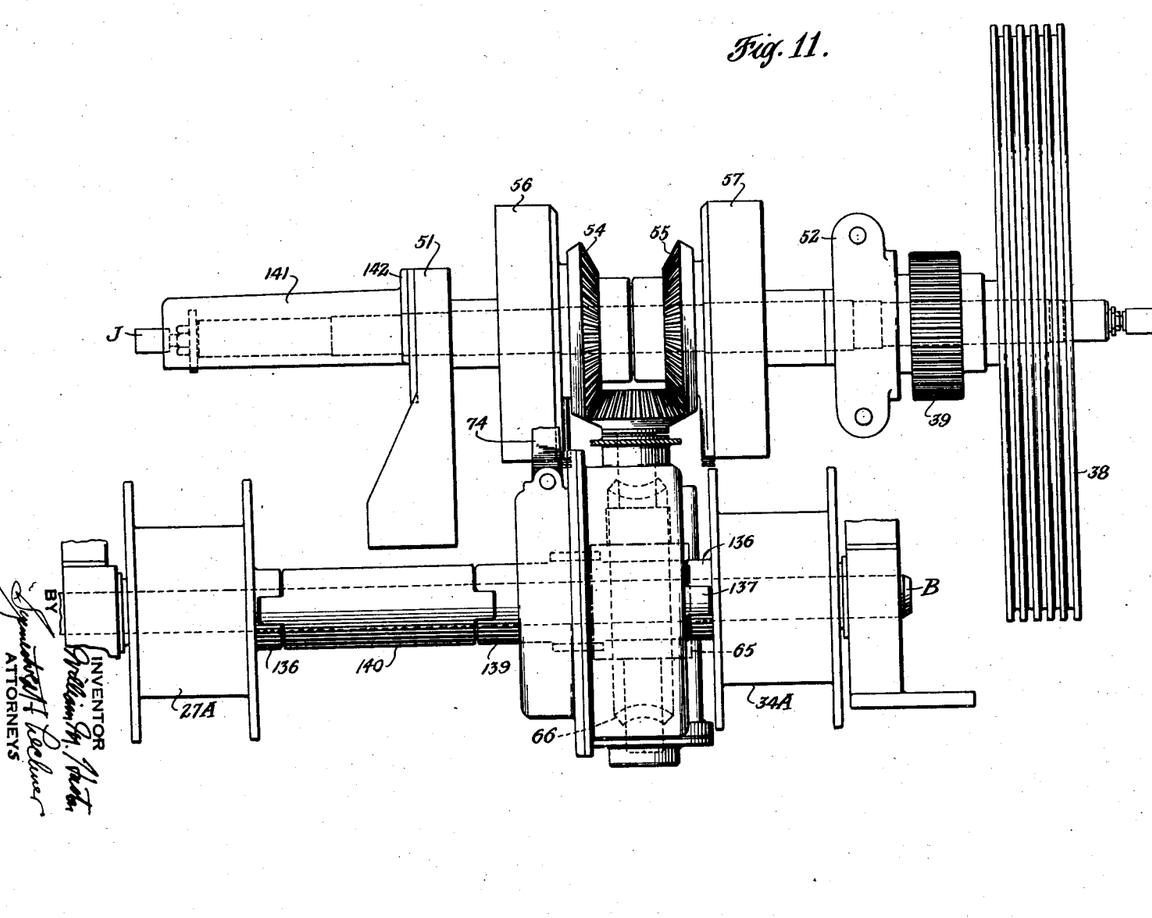

Figure 11 shows an arrangement wherein the spur gear drive has been eliminated. In place of the torque tube 138 mounting the spur gear 87 (of Fig. 10) there is substituted a plain torque tube 140. On the jack shaft, in place of the spur gear drive parts, there may be provided a simple protecting shield 141 mounted by a flange 142 upon the bearing bracket 51.

Figure 12:
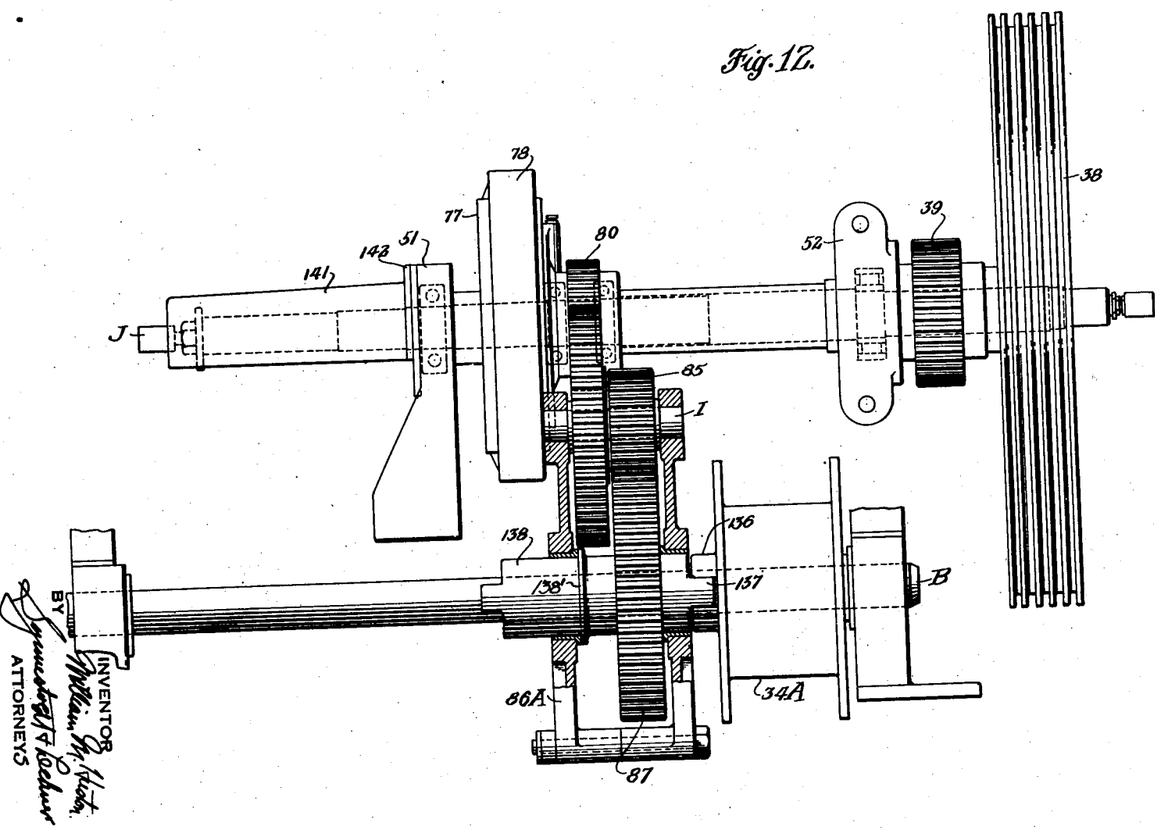

In the assembly of Figure 12, the worm gear drive has been completely omitted, and the spur gear drive has been substituted in the normal location of the worm gear drive. The left-hand boom hoist drum and its driving torque tube 40 have been omitted, although it will be understood that they may be applied, just as in the case of Figure 11, or alternatively the right-hand drum may be omitted, depending upon the simplicity or variety of mechanism and operations desired by the user. The sleeve or tube 138 is positioned within the framing 86A by means of the shoulder 138' and the hub of gear 87.

As in the case of Figure 11, the arrangement of Figure 12 employs a shield 141 over the exposed left end of the jack shaft. To mount the spur gear drive in the location here shown (instead of the location shown in Figs. 2 and 10), it is necessary that the spur gear 80 which is mounted on the jack shaft should be bored out to a larger internal diameter, and/or a different bearing employed, as compared with the arrangement shown at 80, 81 in Fig. 2, since, as will be observed from Figure 2, the jack shaft is formed with a series of sections of progressively larger diameter, from left to right.

Figures 13, 14:
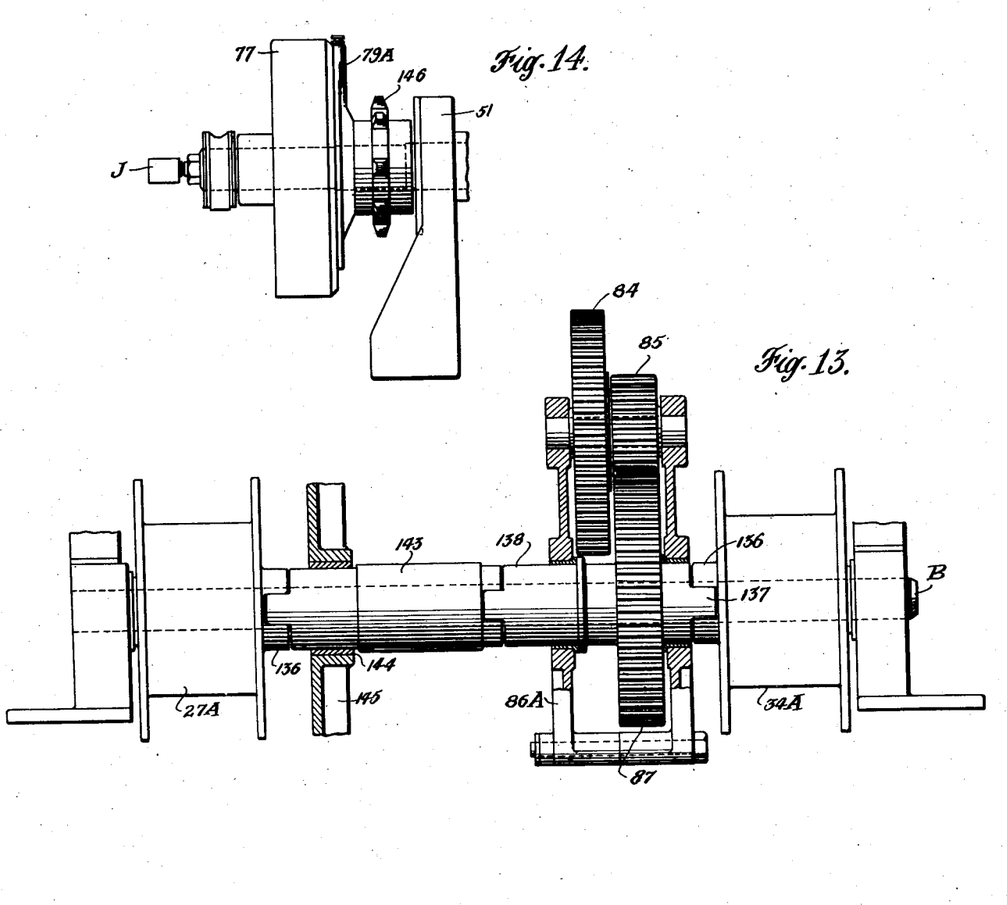

The arrangement of Figure 13, which shows the assembly at the boom hoist drum shaft only (the jack shaft being omitted), is similar to that of Figure 12, but illustrates the double drum arrangement, provided with a special type of torque tube 143, having a shoulder adapted to receive a supplemental bearing 144 supported on a special bracket 145. This gives an added bearing support for the boom hoist shaft adjacent the left-hand drum, in cases where that is necessary.

Figure 14 illustrates a detail at the jack shaft, wherein the flanged spur gear unit (79, 80, of Fig. 2) is superseded by a unit comprising a flange 79A, for attachment to the clutch housing 77, and an integral sprocket 146, for operating the chain crowd, on a shovel employing that type of crowd mechanism. This unit can be used on the jack shaft whether the spur gear drive is used as in Figure 13, or the worm gear drive as in Figure 11.

*Application and use of the invention*

The major benefits of the invention can be secured by utilizing a set of complementary and interchangeable units, such as illustrated in Figs. 10 to 14, which permits the manufacturer to offer a wide range of machine models or styles to the customer, the major changes between styles (in addition to the different booms and their several digging and material handling instrumentalities), being made by substituting and/or adding the various interfitting units on the boom hoist drum shaft, with corresponding changes and/or transposition of elements on the jack shaft.

Such complementary unit system also has the advantage of permitting the customer to purchase a machine for one use, and subsequently convert it for a different use or for alternative uses. For example, he may purchase a machine with a spur gear drive and only a single boom hoist drum (such as shown in Fig. 12) and operate the same as a crane with a "live" boom. If he subsequently has need for another drum on the boom hoist shaft, he can add the same as shown in Fig. 13. Perhaps he secures a contract requiring the use of a "slow" boom (as in setting steel or masonry): he need only purchase the worm drive elements (of Fig. 11) and substitute them for the spur gear drive.

Possibly at some time he undertakes shovel work: and in that event he can couple up the crowding mechanism (for instance, the "crowd retract") to the jack shaft, by applying the unit shown in Fig. 14 in place of the shield shown in Figs. 11 and 12. If full flexibility of operation for all purposes is desired, he can ultimately install a complete set of units as shown in Fig. 10 (which, functionally is the same as the integrated mechanism of Fig. 2, and is capable of adaptation to all of the purposes so far described in the case); and if the smoothest, easiest and safest operation is desired, he can utilize power control and coordination of the spur gear and worm gear drives shown in Fig. 6 (or the alternative shown in Fig. 8).

With reference to the actual installation of the invention, it should be pointed out that the mechanism can be applied not only to new machines, but also (at least as to some features) to existing equipment, without prohibitive changes. For example: certain machines already equipped for operation as a shovel are provided with a clutch and brake unit on the jack shaft (similar to that shown at 77, 78, in Figures 2, 4, 10 and 12) arranged in conjunction with a crowd drum and/or sprocket. In such a machine, if it was initially equipped with a self-locking worm gear boom hoist arrangement having the usual clutches, that part of the mechanism would be modified chiefly by the addition of the special clutch of the present invention (67, 71—Fig. 2) for disconnection of the worm drive when the spur gear drive is operating; and the spur gearing of the present invention would be substituted for the crowd mechanism, the gear 80 occupying that position on the jack shaft from which the crowd mechanism had been removed.

If the machine initially was equipped with a spur gear drive to the boom hoist (which would ordinarily be located at the right, in the location where the worm drive is shown in Figure 4) the spur gear drive could be shifted to the left-hand position, to cooperate with the existing clutch and brake unit (77, 78), and the worm gear drive of the present invention (with its special clutch 67, 71) could be applied in the space thereby left at the right of the mechanism.

The changes just described would provide a certain measure of the advantages of the invention. To secure the advantages of the invention more substantially, however, it is desirable that clutch interlocking and/or power operation of clutches be added (such as is shown in Figures 6 and 7; or alternatively in Figures 8 and 9).

From the foregoing it will be evident how the present invention accomplishes the intended objects and advantages. The mechanism is simple and inexpensive to apply, considering its marked advantages. It also simplifies rather than adding complications to the manipulations of the operator who is handling the machine. In fact, where the clutch coordinating and/or power mechanism of Figure 6 or Figure 8 is included, the operation of the machine becomes still easier.

Though the present invention involves structural additions and/or changes in only a relatively small proportion of the machinery, the entire machine becomes much more flexibly adapted to different types of operations in the field. In addition to its facility in different types of work as a crane (e. g. accurate placement of structural parts when operating through the worm drive, and quick handling of bulk materials when operating through the spur drive), the machine is still readily convertible from crane to shovel, or to trench hoe, etc.

The machine (when rigged as a crane) has not only the operating advantages of rapid gravity drop of the boom under the brake-controlled spur gear drive and the accurate boom lowering of the worm gear drive, but also retains the safety feature of the releasable latch on the spur gear drive and the self-locking characteristic of the worm gear drive. Other forms of transmission may, of course, be substituted for either or both of the two drives disclosed, provided they have one or more of the desired characteristics. Just as an example, a different means might be used in place of the worm and worm wheel and the disengageable clutch associated therewith, although it is considered desirable to have the operating characteristics of these parts, viz. the ability of the drive to lock itself wherever it is stopped (which might be termed "continuously self-locking"), and it is desirable that this drive be capable of ready disconnection, not only for rapid boom raising but more especially for rapid lowering of the boom, as by gravity.

Although I have herein disclosed the present preferred embodiment of the invention, it is within the contemplation of the invention that various modifications may be made, within the scope of the claims when given the broadest interpretation permissible in view of the prior art.

I claim:

1. In a load-handling machine having a boom hoist shaft and a second shaft from which power is to be taken and delivered to a hoist drum on said boom hoist shaft, a clutch unit on the second mentioned shaft positioned adjacent to a location provided for crowd mechanism, and adapted to cooperate therewith, a gear drive adapted to displace said crowd mechanism and to co-operate with said clutch unit for driving a hoist drum on the boom hoist shaft from said other shaft, and a casing for said gear drive, configured also to support an idler gear shaft, and removable as a unit with said gear drive from said boom hoist shaft.

2. For load-handling equipment, a drive shaft, a second shaft having a drum thereon, alternatively-applicable removable transmission units of differing operating characteristics but similar as to shaft mounting for coupling said drive shaft to actuate said drum, and replaceable devices adapted to cooperate with said units and said drum to provide for mounting a transmission unit in different positions with relation to said drum.

3. A construction according to claim 2, wherein said units are configured for transposition.

4. A construction according to claim 2, in which said replaceable devices comprise torque-transmitting sleeves mounted for rotation on the drum shaft adapted for disconnectible engagement with said drum.

5. In a load-handling machine carrying a power plant and a boom which is mounted for raising and lowering, a boom operating system comprising a gear drive between said power plant and said boom for raising the boom at a substantial rate of speed and incorporating means of disconnection whereby the boom may be lowered rapidly under the action of gravity, automatic braking means operative to hold said boom at a given position automatically upon disconnection of said gear drive but constructed to be normally ineffective against raising of said boom, a disconnectible self-locking speed-reduction drive independent of the gear drive for operating the boom at a lesser rate of speed whereby boom raising and lowering at low speed are both positively controlled independently of said braking means, means for selectively operating said drives, and a manual control superimposed on the automatic braking means whereby to regulate said braking means at will.

6. In a load-handling machine carrying a power plant and a boom which is mounted for raising and lowering, a boom operating system comprising a gear drive between said power plant and said boom for raising the boom at a substantial rate of speed and incorporating means of disconnection whereby the boom may be lowered rapidly under the action of gravity, automatic braking means operative to hold said boom at a given position automatically upon disconnection of said gear drive but constructed to be normally ineffective against raising of said boom, a disconnectible self-locking speed-reduction drive independent of the gear drive for operating the boom at a lesser rate of speed whereby boom raising and lowering at low speed are both positively controlled independently of said braking means, means for selectively operating said drives, a manual control superimposed on the automatic braking means whereby to regulate said braking means at will, and means positively coordinating with said manual brake control the disconnection of said two drives.

7. In a load handling machine carrying a power plant and a boom which is mounted for raising and lowering, a boom hoist system comprising a disengageable drive of gear-type between said power plant and said boom adapted to apply power for raising the boom, a second disengageable drive therebetween independent of the first and incorporating self-locking worm means reducing the normal driven speed of the boom as compared with the speed imparted by the first drive, a brake for holding the boom when the gear-type drive is idle, means for selectively engaging said drives, means for reversing the second one of said drives, and means, including control valve means and fluid pressure connections, adapted to positively coordinate the selective operation of said two drives, said reversing means and said brake, whereby the worm drive is inoperative in either direction when the boom is not operating or is being operated by said gear-type drive.

WILLIAM M. HUSTON.

REFERENCES CITED

The following references are of record in the file of this patent:

UNITED STATES PATENTS

| Number | Name | Date |
|---|---|---|
| 352,333 | LeDuke | Nov. 9, 1886 |
| 599,896 | Foote | March 1, 1898 |
| 754,043 | Bradley | March 8, 1904 |
| 894,232 | Richards | July 28, 1908 |
| 954,881 | Phillips | Apr. 12, 1910 |
| 1,247,190 | Werner | Nov. 20, 1917 |
| 1,315,782 | Leggett | Sept. 9, 1919 |
| 1,328,717 | Coates | Jan. 20, 1920 |
| 1,390,905 | Head | Sept. 13, 1921 |
| 1,418,490 | Sproul | June 6, 1922 |
| 1,452,690 | Kane | Apr. 24, 1923 |
| 1,506,906 | Holcomb et al. | Sept. 2, 1924 |
| 1,556,595 | Ewing | Oct. 13, 1925 |
| 1,599,205 | Caldwell | Sept. 27, 1926 |
| 1,698,748 | Wilson | Jan. 15, 1929 |
| 1,732,122 | DeLeeuw | Oct. 15, 1929 |
| 1,751,633 | Holcomb | Mar. 25, 1930 |
| 1,887,444 | Turney | Nov. 8, 1932 |
| 1,933,874 | Russell | Nov. 7, 1933 |
| 1,966,759 | Huston | July 17, 1934 |
| 1,980,297 | Scott | Nov. 13, 1934 |
| 2,010,280 | Thiman | Aug. 6, 1935 |
| 2,098,308 | Ramsey | Nov. 9, 1937 |
| 2,204,143 | Meyer | June 11, 1940 |
| 2,223,863 | Wunsch | Dec. 3, 1940 |
| 2,233,703 | Hatch | March 4, 1941 |
| 2,254,083 | Nickles et al. | Aug. 26, 1941 |
| 2,258,478 | Baker | Oct. 7, 1941 |
| 2,282,731 | Larsen et al. | May 12, 1942 |
| 2,335,318 | Simmons | Nov. 30, 1943 |